W. S. BAIRD.
SNAPPING MECHANISM FOR CORN HARVESTING MACHINES.
APPLICATION FILED FEB. 27, 1909.
1,035,518.
Patented Aug. 13, 1912.
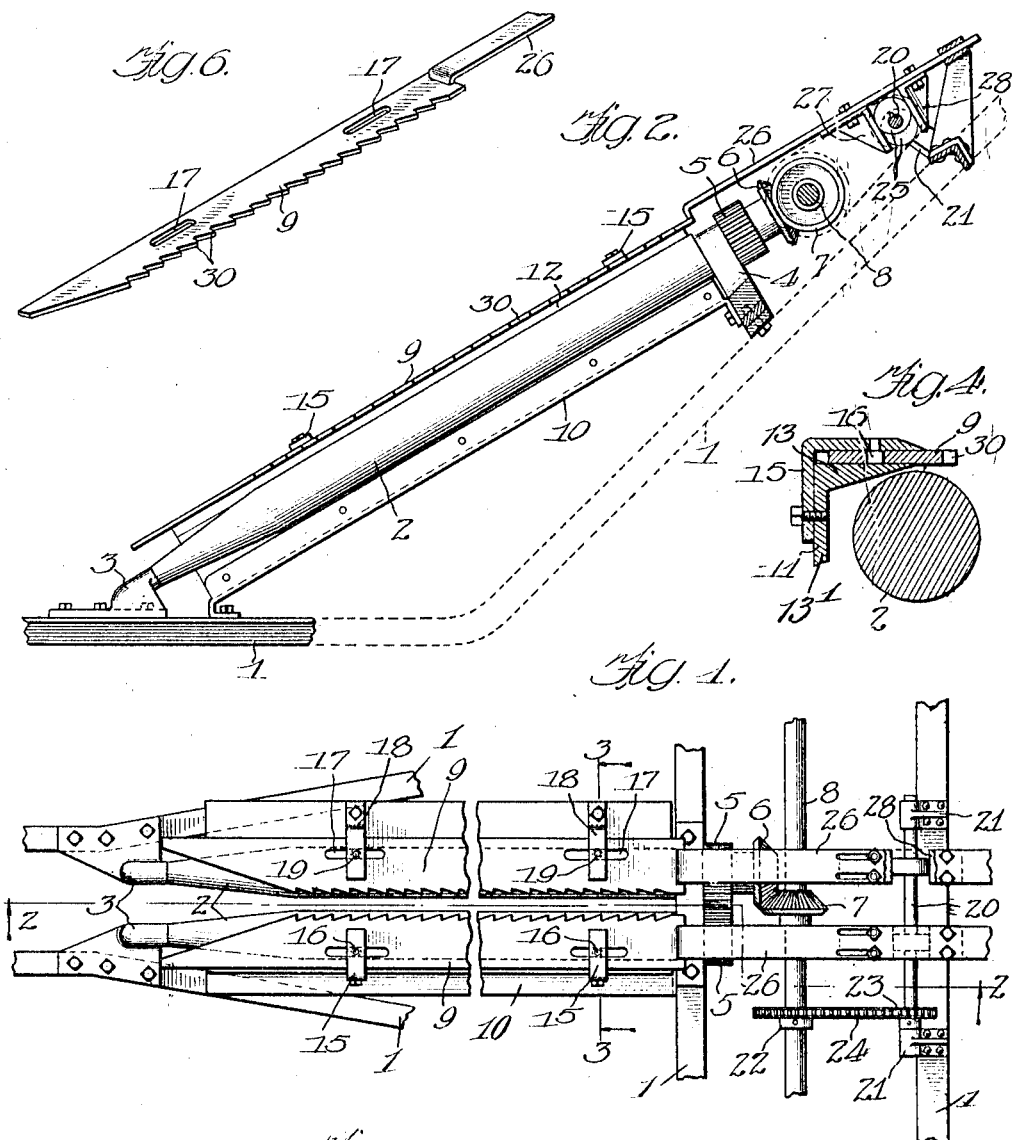

UNITED STATES PATENT OFFICE.

WILLIAM SEWARD BAIRD, OF CHICAGO, ILLINOIS, ASSIGNOR TO BAIRD CORN HUSKER CO., A CORPORATION OF SOUTH DAKOTA.

SNAPPING MECHANISM FOR CORN-HARVESTING MACHINES.

1,035,518. Specification of Letters Patent. Patented Aug. 13, 1912.

Application filed February 27, 1909. Serial No. 480,418.

*To all whom it may concern:*

Be it known that I, WILLIAM SEWARD BAIRD, a citizen of the United States, residing at Chicago, county of Cook, and State of Illinois, I ave invented certain new and useful Improvements in Snapping Mechanism for Corn-Harvesting Machines, of which the following is a description.

My invention relates to means adapted to form a part of a corn harvesting machine for automatically removing the ears from the stalks of the standing corn.

The object of my invention is to provide mechanism for removing the ears from the stalks wherein the pressure is so applied to the butt of the ear as to avoid any appreciable shelling of the kernels from the cob.

To this end my invention consists in the novel construction, arrangement, and combination of parts herein shown and described and more particularly pointed out in the claims.

In the accompanying drawings, wherein like or similar reference characters indicate like or corresponding parts; Figure 1 is a plan view of that portion of a corn harvesting machine embodying my invention with the remainder of the machine removed to avoid confusion. Fig. 2 is a section taken substantially on line 2—2 of Fig. 1. Fig. 3 is a section taken substantially on line 3—3 of Fig. 1. Fig. 4 is an enlarged detail of a portion of the mechanism shown in Fig. 3. Fig. 5 is an enlarged perspective detail of the shaft and cams for operating a portion of my improved mechanism. Fig. 6 is an enlarged perspective detail of one of the snapping bars of my device.

In the preferred form shown in the drawings, 1—1 is a portion of the frame of a corn harvesting machine upon which the snapping rolls 2—2 are mounted by means of suitable bearings 3—3 and 4—4 at opposite ends respectively of the rolls. The bearings 3—3 at the lower ends of the rolls are preferably so formed that as the machine is moved along the rows the stalks will be directed into the space between the rolls where they may be engaged to remove the ears therefrom. Any suitable means may be provided to rotate the rolls 2. As shown suitable pinions 5—5 are provided at the upper end of each roll adapted to coöperate to secure a uniform rate of rotation to the rolls, and a bevel, or miter gear 6 is provided upon the extended shaft at the upper or rear end of one of the rolls adapted to coöperate with a similar gear 7 upon a shaft 8 of the machine to drive the rolls. The shaft 8 may be mounted upon the frame 1—1 in any suitable manner and may be rotatively connected in any convenient manner to suitable rotating parts of the machine (not shown). This portion of the mechanism is preferably formed and operated substantially as shown and described in my patent for a corn husking machine, No. 892,208, dated June 30th, 1908.

My present invention comprises mechanism adapted to coöperate with the snapping rolls above described and consists of a pair of bars 9—9 arranged directly above the snapping rolls and adapted to engage the ears upon the stalks and assist in detaching the same so that the butt of the ears will not come in contact with the rolls 2—2. The bars 9—9 are preferably positioned in a plane substantially parallel to the rolls 2—2 directly above the same and in as close proximity to the upper face of the rolls as is practicable. The space between the bars is preferably substantially the same as the space between the rollers, so that the operating edge of each bar is in practically the same vertical plane as the inner edge of the roll with which it operates, although this adjustment may be changed to suit the varying conditions of the corn to be harvested.

Any suitable means may be provided for supporting the bars 9—9 in position. As shown beams 11 and 12 are provided extending substantially parallel with the rolls for this purpose. The beam 11 is formed with a suitable flat top or face 13 adapted to receive and support a bar 9 substantially parallel to the common plane of the rolls and with a flange or web 13′ extending from to receive and support a bar 9 substantially right angles thereto. The beam 12 is similarly formed except that the web 14′, is preferably positioned approximately midway of the face 14 upon which the bar 9 rests, so that this beam is substantially T-shaped.

In the preferred construction shown, a pair of angular bars 10—10 are rigidly secured to the frame one upon each side of the rolls 2 and extending substantially parallel thereto, and the webs 13′ and 14′ of the beams 11 and 12 are rigidly secured to the bars 10 respectively. If desired the proximate edges of the parts 13 and 14 of the beams 11 and 12 may be beveled or tapered slightly from the under side as shown so as to permit the bars 9—9 to be brought into as close proximity to the tops of the rolls as possible. As shown the bars 9—9 are arranged to be reciprocated longitudinally and for this purpose a slot 17 is provided near each end of each bar. A pair of arms 15 are attached to the web 13' of the beam 11 suitably formed to extend above the bar 9 mounted upon said beam and secure the same in position. A stud 16 or other suitable means is secured to each of the arms 15 extending into each slot 17 to control the movements of the bar 9. The opposite bar 9 is shown mounted upon the beam 12 in a very similar manner except that the arms 18 for securing the bar in position and carrying the studs or pins 19 for engaging the slots 17, are secured to the part of the face 14 of the beam 12 at the outer side of the web 14', suitable transverse slots are preferably provided in this portion of the beam 12 so that the lateral position of the bar 9 may be adjusted as desired. Any suitable means may be provided to reciprocate the bars 9—9. In the form shown a shaft 20 is rotatably mounted in suitable bearings 21—21 upon the frame 1 substantially parallel to the shaft 8. Sprocket wheels 22— and 23 or equivalent means are mounted upon the shafts 8 and 20 respectively and connected by a chain 24 or other suitable means adapted to cooperate therewith to transmit power from the shaft 8 to the shaft 20, a pair of cams or eccentrics 25—25 are rigidly secured to the shaft 20, and a part 26 is rigidly attached to each bar 9 extending above and beyond the shaft 20. Suitable jaws or faces 27 and 28 are rigidly secured to each part 26 adapted to cooperate with the cams 25 respectively to control the movements of the bars 9.

In the preferred construction the cams 25 are so positioned that the movements of the bars 9 will alternate, that is, when one bar is moved downward the opposite bar will be moved upward, when thus operated it is obvious that an ear of corn upon a stalk, drawn downward firmly against the bars will be twisted by the movement of the bars and thereby wrenched from the stalk. In the preferred construction also a plurality of rearwardly directed teeth 30 are provided upon each of the bars 9 preferably evenly spaced from the proximate edges of each, the spaces between the teeth 30 is preferably slightly less than the relative movement of the bars so that the stalks positioned between the bars will be alternately engaged by the teeth or notches and advanced along the bars by their reciprocation, thus feeding the stalks along the rolls to correspond with the forward movement of the machine.

Having thus described my improvement it is obvious that various immaterial modifications may be made in my device without departing from the spirit of my invention, hence I do not wish to be understood as limiting myself to the exact form and construction shown.

What I claim as new, and desire to secure by Letters Patent is:—

1. In a device of the character described, means adapted to engage the stalks, ear engaging means comprising a pair of spaced bars having parallel adjacent edges, supporting members for one of said bars, means for reciprocating one of said bars, guiding means carried by the supporting member for said reciprocating bar and coöperating with said bar to maintain the inner edge thereof parallel to the inner edge of the other of said bars during its reciprocatory movement.

2. In a device of the character described, means adapted to engage the stalks, ear engaging means comprising a pair of substantially parallel spaced bars, fixed supporting members underlying said bars, means for reciprocating said bars, guiding means carried by said supporting members and slidably engaging said bars to maintain the same in parallelism during reciprocation, and means for reciprocating said bars longitudinally.

3. In a device of the kind described, means adapted to engage the stalks, a pair of substantially parallel reciprocating bars adapted to coöperate to engage the ears, a plurality of teeth arranged upon the proximate edges of said bars, means for preventing a transverse movement of said bars during their operation and means for reciprocating said bars longitudinally.

4. In a device of the kind described, means adapted to engage the stalks, a pair of substantially parallel bars adapted to coöperate to engage the ears, a plurality of substantially evenly spaced rearwardly directed teeth upon the proximate edges of said bars, adjustable means for preventing transverse movement of one of said bars during this operation, and means for reciprocating one of said bars longitudinally.

5. In a device of the kind described, means adapted to engage the stalks, a pair of bars arranged in substantially a common plane adapted to coöperate to engage the ears, means for supporting said bars substantially throughout their length and arranged to prevent a transverse movement thereof and means for reciprocating one of said bars longitudinally.

6. In a device of the character described, a pair of snapping rolls, a pair of longitudinally movable spaced bars positioned above said rolls and provided with parallel toothed edges, means for reciprocating said bars longitudinally comprising a plurality of cam members positioned to engage said bars, means for operating said cam members, and guiding means for said bars to maintain the toothed edges thereof in parallelism during reciprocation of the bars.

7. In a device of the character described, a pair of snapping rolls, a pair of spaced bars positioned above said rolls and provided with parallel toothed inner edges, means for alternately reciprocating said bars longitudinally, and means carried by said supporting means and coöperating with said bars to maintain the toothed edges thereof in parallel relation at all times.

8. In a device of the kind described, a pair of snapping rolls, and a pair of movable bars positioned above and proximate to said rolls adapted to coöperate therewith to remove the ears from the stalks, means for supporting said bars substantially throughout their length, means for preventing a transverse movement thereof during their operation and means for reciprocating said bars longitudinally.

9. In a device of the character described, a pair of snapping rolls, ear engaging means adapted to coöperate therewith comprising a pair of spaced longitudinally movable toothed bars, means for adjusting one of said bars relatively to the other to vary the width of the space therebetween, and means for reciprocating one of said bars longitudinally and parallel to the other bar.

10. In a device of the character described, a pair of snapping rolls, ear engaging means adapted to coöperate therewith comprising a pair of spaced longitudinally movable toothed bars, means for adjusting one of said bars relative to the other to vary the width of the space therebetween, and means for alternately reciprocating said bars longitudinally with the toothed edges thereof in parallelism.

11. In a device of the kind described, a pair of snapping rolls, a pair of longitudinally movable bars arranged substantially parallel to, and above, said rolls, and in substantially a common plane, and adapted to coöperate with said rolls to remove the ears from the stalks, means for supporting said bars substantially throughout their length, and adjustable means for preventing a transverse movement of said bars during their operation and means for alternately reciprocating said bars longitudinally.

12. In a device of the kind described, a pair of snapping rolls, a pair of bars arranged substantially parallel to, and above, said rolls, one bar held against lateral displacement and the other bar adjustably retained against transverse movement, but arranged to be longitudinally reciprocated and positioned in substantially a common plane, adapted to coöperate with said rolls to remove the ears from the stalks, and a plurality of substantially evenly spaced rearwardly directed teeth arranged upon the proximate edges of said bars, and means for reciprocating one of said bars longitudinally.

In testimony whereof, I have hereunto signed my name in the presence of two subscribing witnesses.

WILLIAM SEWARD BAIRD.

Witnesses:
 BURTON U. HILLS,
 CHARLES I. COBB.